Figure 3:
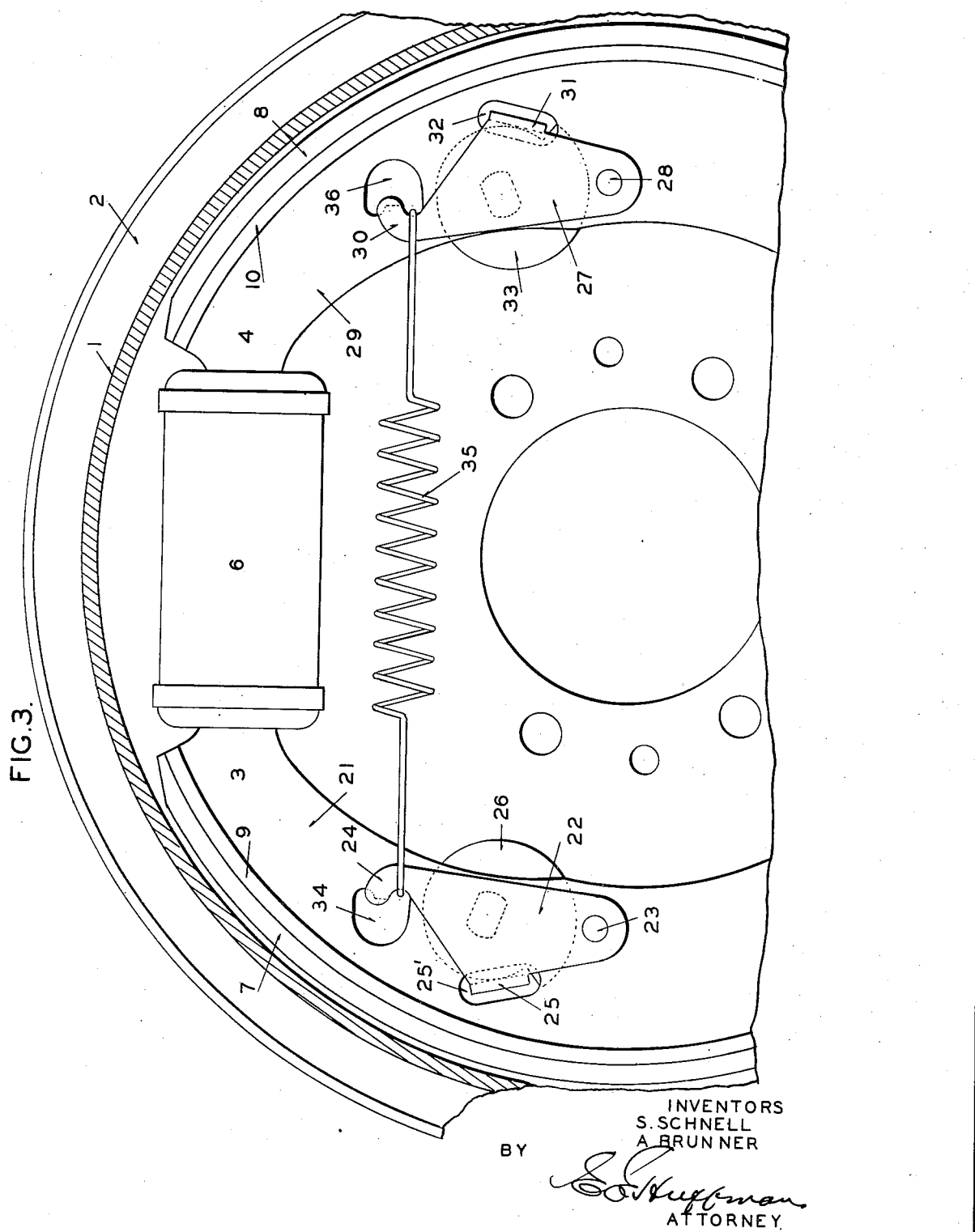

Oct. 21, 1941.  S. SCHNELL ET AL  2,259,835
COMPENSATING MEANS FOR BRAKE DRUM DISTORTION
Filed Oct. 3, 1940  2 Sheets-Sheet 1
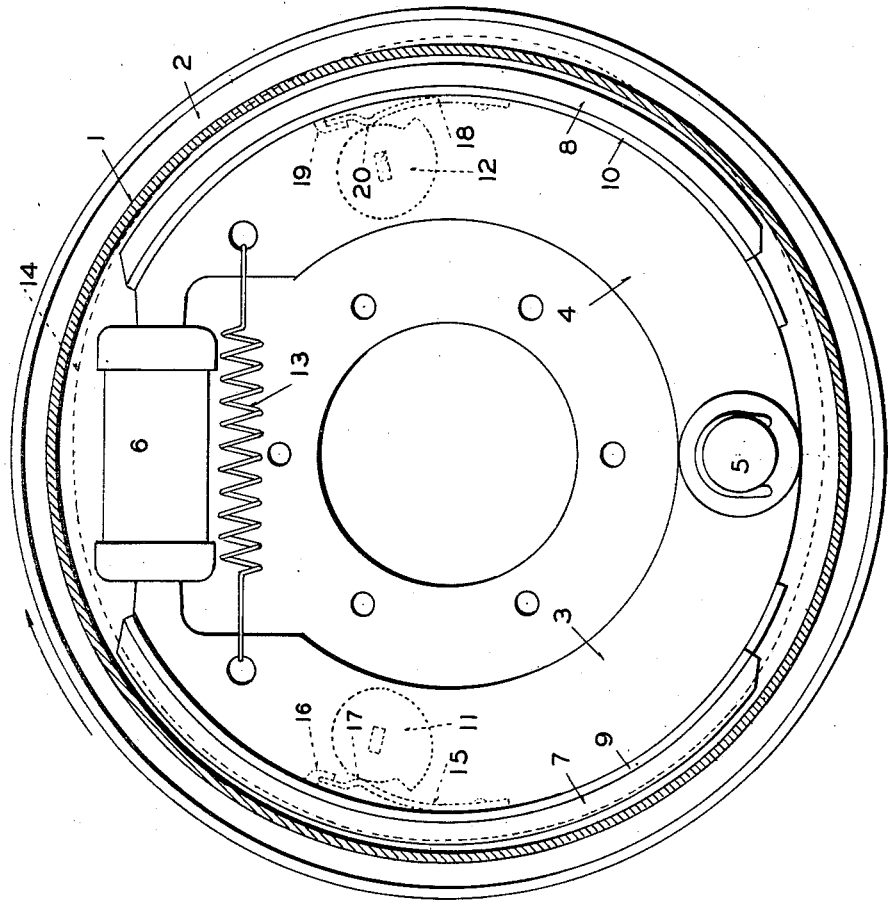
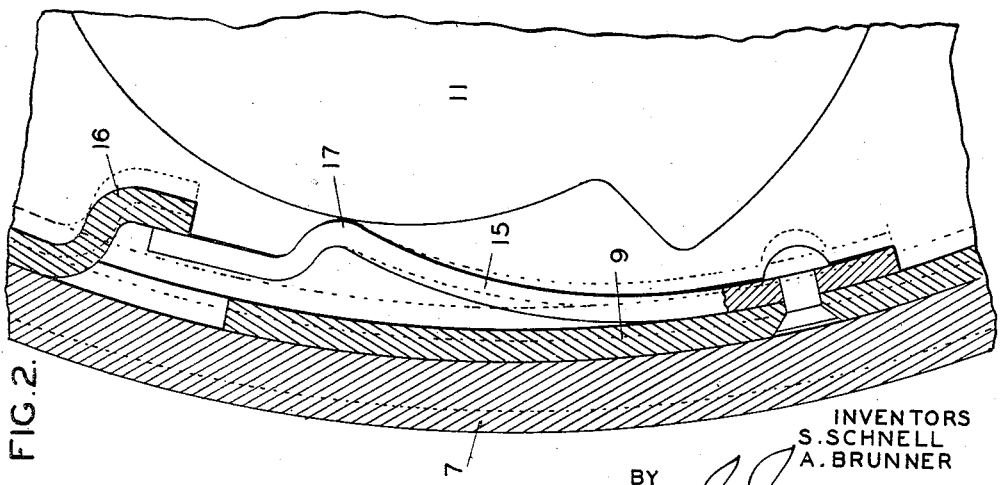
INVENTORS
S. SCHNELL
A. BRUNNER
BY
ATTORNEY Oct. 21, 1941.  S. SCHNELL ET AL  2,259,835
COMPENSATING MEANS FOR BRAKE DRUM DISTORTION
Filed Oct. 3, 1940  2 Sheets-Sheet 2

INVENTORS
S. SCHNELL
A. BRUNNER
BY
ATTORNEY

Patented Oct. 21, 1941

2,259,835

UNITED STATES PATENT OFFICE 2,259,835

COMPENSATING MEANS FOR BRAKE DRUM DISTORTION

Steve Schnell, Overland, and Albert Brunner, Jennings, Mo., assignors to Wagner Electric Corporation, St. Louis, Mo., a corporation of Delaware Application October 3, 1940, Serial No. 359,516

10 Claims. (Cl. 188—79.5)

Our invention relates to brakes and more particularly to means for compensating for brake drum distortion during braking application.

It is well known in braking apparatus of the type employing a drum and internal brake shoes that the drum becomes distorted or "out of round" during the braking when a large brake actuating force is used. Since the shoes are in engagement with the drum at this time, they will be shifted from the position they assume when initially engaging the drum. This shifting of the shoes as a result of drum distortion may be of such magnitude as to cause one of the shoes to move back and abut the usual fixed retractile stop (determining the "off" position of the shoe) which in practice is an adjustable cam. If this occurs, there will be created a high pressure point between the shoe and drum which may cause the brake to "squeal." It is, therefore, one of the objects of our invention to provide means in a brake of the type described which will prevent the above described condition from occurring when brake drum distortion takes place and to so embody said means in the brake that the normal "off" position of the shoe when disengaged from the drum will still be possible.

A more specific object of our invention is to provide a yieldable means so associated with a brake shoe and an "off" position stop therefor that said shoe will be capable of yielding to permit the shoe to be moved back only during braking to a position inward of its normal "off" position.

Other objects of our invention will become apparent from the following description taken in connection with the accompanying drawings in which Figure 1 is a view of a brake embodying our invention; Figure 2 is an enlarged view of the construction embodying our invention showing how it is associated with one brake shoe and its adjustable stop; and Figure 3 is a view of a brake showing a different structure embodying our invention and the manner in which it is associated with the brake shoes and their adjustable stops.

Referring in detail to Figures 1 and 2, the numeral 1 indicates a drum fixed to a rotatable element to be braked such as the wheel of a vehicle and 2 a support or backing plate secured to a fixed member such as the axle housing and enclosing the open side of the drum. Within the drum are two shoes 3 and 4 in end-to-end relation and both pivoted at one pair of adjacent ends to a single anchor pin 5 fixed to the support. The other pair of adjacent ends is adapted to be spread apart and the shoes engaged with the drum by a suitable actuator shown as a fluid motor 6 which is connected to receive fluid under pressure from a remote source as is common practice. The shoes 3 and 4 have linings 7 and 8 on their lining carrying portions 9 and 10. On the support are mounted adjustable cam stops 11 and 12, the former for shoe 3 and the latter for shoe 4. A retractile spring 13 is connected to the actuated ends of the shoes to pull them off the drum when the fluid motor is released.

In the type of brake just described, it has been usual practice to have the adjustable cam stops directly engaged by the lining carrying portions of the shoes when the shoes were retracted from the drum by the retractile spring. The stops were so adjusted that the lining would have the desired clearance of a few thousandths of an inch with the drum when the shoes were retracted. As the linings wore, the cams could be manually adjusted to again obtain proper clearance. It has been found that such an arrangement caused undesirable results when the brake shoes were engaged by such a large force from the actuating fluid motor that the drum was caused to distort. Thus, for example, if the drum is rotating in the direction indicated by the arrow and a high pressure is applied to the shoes by the fluid motor, the drum will be distorted to a shape shown by the dotted line 14. The distorted drum takes an "out of round" or oval shape due to the mounting of the shoes. Shoe 4 acts as a "forward" shoe and shoe 3 as a "reverse" shoe and, therefore, shoe 4 will have a much higher pressure engagement with the drum than shoe 3 due to its self-energizing effect. This will cause the portion of the drum engaged by shoe 4 to be pushed outwardly and the portion of the drum engaged by shoe 3 to be pulled inwardly in the manner indicated. Both shoes thus rotate in the same direction about pivot 5 and shift with the drum as said drum distorts. If the distortion should be as great as shown, shoe 3 will be pushed back against its stop as an abutment and since it can go no further, a high pressure point will be created between the drum and shoe lining adjacent the stop and a "squeal" will probably result.

In order to eliminate this undesirable result, we have devised a means for preventing the shoe from being forced against the fixed cam yet permitting the shoe to always assume the desired "off" position with the drum when it is retracted by the retractile spring. As shown in Figures 2 and 3, the structure employed comprises a leaf spring carried by each shoe for cooperation with the cam stop. The leaf spring 15 for shoe 3 is riveted at one end to the lining carrying portion 9 and so formed that it will have its free end spaced from the lining carrying portion. A part of the lining carrying portion is struck out to form an abutment 16 to limit the distance the free end of the spring can be flexed away from the portion 9. The abutment does not prevent free relative movement of the portion 9 and the free end of the spring toward each other. The central part of the spring is provided with a hump 17 for engagement with the cam 11. The other brake shoe 4 has a similar leaf spring 18 riveted thereto and cooperating at its free end with an abutment 19 on the lining carrying portion 10. The hump 20 on the spring cooperates with the cam 12.

When the shoes are retracted by the spring 13, both leaf springs will be held in engagement with their respective cams and when in this position the shoe linings will have the desired "off" position clearance with respect to the drum. The leaf springs are so distorted and of such strength as not to be flexed away from their respective abutments by the retractile spring.

In operation the normal "off" position of the shoe is as shown in Figure 1. The retractile spring 13 holds the leaf springs 15 and 18 against the stops 11 and 12, respectively. The setting of the cam stops determines the normal "off" positions of the shoes. If the shoes are now applied to the drum when it is rotating in the direction of the arrow and with such pressure that the drum will be distorted to a shape approximating the dotted line 14, the shoe 3 will be forced inwardly toward the drum center and to a point beyond the normal "off" position. When the shoe reaches its "off" position, the leaf spring 17 will engage the cam stop 11. Additional inward movement of the shoe then causes flexing of the leaf spring and its movement relative to the shoe and away from the abutment 16. The shoe moves inward beyond its "off" position against a yieldable resistance. The position of shoe 3 and leaf spring 15 when said spring is flexed by inward shoe movement is illustrated by dotted lines in Figure 2. When the brake is released and the drum assumes normal shape, the shoe will again be placed in its normal "off" position by the return of the leaf spring to its position against the abutment 16. If the drum is rotating in the opposite direction and brake application causes such distortion of the drum that it moves shoe 4 inwardly to a point beyond its normal "off" position, such is permitted by the flexing of the leaf spring 18 in the same manner as is done by leaf spring 15.

From the above described structure it is seen that there is no possibility of drum distortion causing the shoes to be forced back against a fixed abutment yet the shoes are always permitted to assume the desired "off" position close to the drum when the brake is released.

In the structure shown in Figure 3 the support, drum, brake shoes, etc., are the same as in Figure 1 and indicated by the same reference characters. The web 21 of shoe 3 has mounted thereon a lever 22, one end of which is pivoted at 23 and the other and free end formed with a hooked portion 24. The intermediate portion of the lever has an integral flange 25 projecting through an enlarged opening 25' in the web in order to engage the adjustable cam stop 26 carried by the support. The other shoe 4 is provided with a like lever 27 pivoted at one end by a pin 28 to the shoe web 29 and having a hooked portion 30 at its other free end. The flange 31 on the intermediate portion of the lever extends through an enlarged opening 32 in the web in order to engage the adjustable cam stop 33 carried by the support.

The web 21 of shoe 4 has an opening 34 adjacent the free end of lever 22 and one end of the retractile spring 35 is hooked around said free end and through the opening 34. Similarly the web 29 has an opening 36 adjacent the free end of the lever 27 and the other end of the retractile spring is hooked around said free end and through the opening 36. By this construction the retractile spring normally holds each lever from relative movement with respect to its web and toward the lining carrying portion and also provides means for retracting the shoes so that when the flanges on the levers engage their respective stops, the shoes will be in their normal "off" positions. In the "off" position of the shoe the lever cannot rotate inwardly with respect to the shoe because of the lever's engagement with the cam. Also the shoe cannot rotate inwardly with respect to the lever because of the pull of spring 35 on the lever and acting through the cam as a fulcrum. The "off" position of each shoe can be adjusted as the lining wears by rotating its cam stop.

If, during braking, such drum distortion should take place that either shoe (depending on the direction of rotation of the drum) should be forced back toward the center of the drum and beyond its normal "off" position, it is permitted to have such movement without engaging a fixed stop. When a shoe reaches its normal "off" position, the flange on the lever engages the cam stop and establishes a fulcrum point. Further inward movement of the shoe causes the lever to be rotated relatively to the shoe about this fulcrum point and in a direction to stretch the retractile spring. Thus the shoe moves inwardly against a yieldable resistance. The slots 25' and 32 are of such size as to not restrict necessary relative movement between a lever and shoe for the structure to function properly. The only purpose of each slot is to permit a lever which is on one side of a shoe web to cooperate with the cam on the other side. When the shoe is released and the drum is permitted to assume normal shape, the retractile spring causes the lever to return to normal position and the shoe to assume its proper "off" position as determined by the cam stop.

In the construction shown in Figure 3 it is to be noted that the retractile spring serves to retract the shoe from the drum when the shoe is released and also as the yieldable means for permitting the shoe to be moved inwardly during braking by drum distortion and to a position inward of the "off" position.

Being aware of the possibility of modifications in the particular structures herein described without departing from the fundamental principles of our invention, we do not intend that its scope be limited except as set forth by the appended claims.

Having fully described our invention, what we claim as new and desire to secure by Letters Patent of the United States is:

1. In braking apparatus, a rotatable drum, a support, a brake shoe mounted on the support for cooperation with the drum, means including a fixed stop for causing said shoe to have a predetermined "off" position with respect to the drum when retracted, and means for permitting the shoe to be moved closer to the center of the drum than said "off" position when said shoe is acted upon during brake application by a force created by drum distortion, said means being ineffective to alter the relationship between the shoe and the stop when the shoe is retracted after any brake application.

2. In braking apparatus, a rotatable drum, a support, a brake shoe mounted on the support for cooperation with the drum, a fixed stop on the support, and means associated with the shoe and the stop causing the shoe to have a predetermined "off" position with respect to the drum when retracted, said means being yieldable under a force created by distortion of the drum during braking to permit the shoe to be moved closer to the center of the drum than said "off" position, but unaffected by changes in temperature during braking to alter the relationship between the shoe and the stop when the shoe is retracted after any brake application.

3. In braking apparatus, a rotatable drum, a support, a brake shoe mounted on the support for cooperation with the drum, a fixed stop on the support for determining the normal "off" position of the shoe, said drum being subject to such distortion during braking that it will if permitted move the shoe toward the center of the drum and to a point beyond its normal "off" position, and yieldable means so associated with the stop and the brake shoe permitting said shoe to assume normal "off" position without yielding or to yield and permit the shoe to be moved further toward the center of the drum than said normal "off" position if so caused by drum distortion during braking, said yieldable means being unaffected by changes in temperature during braking to alter the relationship between the shoe and the stop when the shoe is retracted after any brake application.

4. In braking apparatus, a brake drum, a support, a brake shoe engageable with the drum, a stop on the support, a spring secured to the shoe and adapted to engage the stop and determine the "off" position of the shoe when the shoe is disengaged from the drum, said spring being unaffected by changes in temperature to alter its relationship with the shoe but being capable of flexing and permitting the shoe to move relatively to the stop and closer to the center of the drum than when in its normal "off" position, and a retractile spring for the shoe, said springs being so related that the first named spring cannot be flexed by the retractile spring when caused to engage the stop.

5. In braking apparatus, a brake drum, a support, a brake shoe engageable with the drum, a stop on the support, a leaf spring secured to the shoe and of material unaffected by changes in temperature during braking to alter its relationship with the shoe, an abutment on the shoe for limiting the flexing of the spring away from the shoe, said spring normally engaging the abutment but free to be flexed toward the shoe, and a retractile spring for the shoe holding the leaf spring in engagement with the stop when the shoe is disengaged from the drum, said leaf spring having such resistance against flexing toward the shoe that it will not be moved away from the abutment when the shoe is retracted and the leaf spring is caused to engage the stop under the action of the retractile spring.

6. In braking apparatus, a rotatable drum, a support, a brake shoe engageable with the drum, a stop on the support, a retractile spring for the shoe, and means so cooperating with the spring, the stop and the shoe as to cause the shoe to assume a predetermined "off" position with respect to the drum when the shoe is disengaged but permitting the shoe to be moved closer to the center of the drum during braking action and by a force created by distortion of the drum, said movement of the shoe beyond the "off" position being opposed by the retracting pull of the retracting spring.

7. In braking apparatus, a rotatable drum, a support, a brake shoe engageable with the drum, a stop on the support, a member mounted on the shoe for relative movement thereto and having a portion engaging the stop when the shoe is retracted from the drum, a spring acting on the shoe and the member and biasing the shoe to the retracted position where the member engages the stop, said member being normally prevented by the spring from having relative movement with respect to the shoe when it engages the stop, said member having relative movement with respect to the shoe and against the bias of the spring when distortion of the drum during braking causes the shoe to be moved closer to the center of the drum than the retracted position.

8. In braking apparatus, a rotatable drum, a support, a brake shoe engageable with the drum, a stop on the support, a lever pivoted on the shoe and having a portion engageable with the stop when the shoe is disengaged from the drum, and a retractile spring acting on both the shoe and the lever to hold the shoe disengaged and the lever in engagement with the stop, said lever and spring permitting said shoe to be moved to a position closer to the center of the drum when a sufficient force acts on the shoe to cause the lever to fulcrum on the stop and rotate relatively to the shoe and against the bias of the spring.

9. In braking apparatus, a rotatable drum, a support, a brake shoe engageable with the drum, a stop on the support, a lever pivoted at one end on the shoe and having an intermediate portion engageable with the stop when the shoe is disengaged from the drum, and a retractile spring acting on both the shoe and the other end of the lever to hold the shoe disengaged and the lever in engagement with the stop, said lever being capable of relative pivotal movement with respect to the shoe and toward the drum and against the bias of the spring when a sufficient force acts on the shoe to move it to a position closer to the center of the drum than the position it assumes when the shoe is disengaged and the intermediate portion of the lever engages the stop.

10. In braking apparatus, a rotatable drum, a support, two brake shoes in end-to-end relation in the drum, means for pivotally mounting one pair of adjacent ends to the support, means for actuating the other adjacent ends, a stop for each shoe, a single retractile spring for the shoes, and means associated with each shoe, its stop and the retractile spring for causing both shoes to have a predetermined "off" position with respect to the drum when the shoes are disengaged by the spring but permitting each shoe when engaged with the drum to be moved by drum distortion closer to the center of the drum than said predetermined "off" position, said shoe movement being opposed by the retractile spring.

STEVE SCHNELL.
ALBERT BRUNNER.